United States Patent [19]

Cooley

[11] Patent Number: 4,826,469

[45] Date of Patent: May 2, 1989

[54] BELT ADJUSTER

[76] Inventor: John Cooley, 208 Haystack Rd., Zephyrhills, Fla. 34249

[21] Appl. No.: 135,690

[22] Filed: Dec. 21, 1987

[51] Int. Cl.⁴ ............................................. F16H 7/08
[52] U.S. Cl. .................................. 474/101; 411/161; 474/113
[58] Field of Search ............... 474/101, 113, 114, 119; 248/122, 124, 125, 274; 411/161, 163; 403/2, 3, 22

[56] References Cited

U.S. PATENT DOCUMENTS

| 429,877 | 6/1980 | Anderson | 474/119 |
|---|---|---|---|
| 776,991 | 12/1904 | Blue | 411/163 X |
| 889,593 | 6/1908 | Fleischman | 411/161 |
| 2,841,961 | 7/1958 | Lucas | 405/199 |
| 3,004,443 | 10/1961 | Gerrans | 474/114 X |
| 3,014,346 | 12/1961 | Small | 405/198 |
| 4,561,624 | 12/1985 | Freeman | 474/114 X |
| 4,618,336 | 10/1986 | Isobe et al. | 474/113 X |

Primary Examiner—Thuy M. Bui

[57] ABSTRACT

A belt adjusting device for "V" belts which uses a gear made integrally with a nut, in cooperation with a locking mechanism, and gear teeth on a plate to produce relative movement between the plate and the mount, thus tensioning or loosening the "V" belt as desired, and allowing it to be locked into position with the locking mechanism, once adjusted.

3 Claims, 2 Drawing Sheets

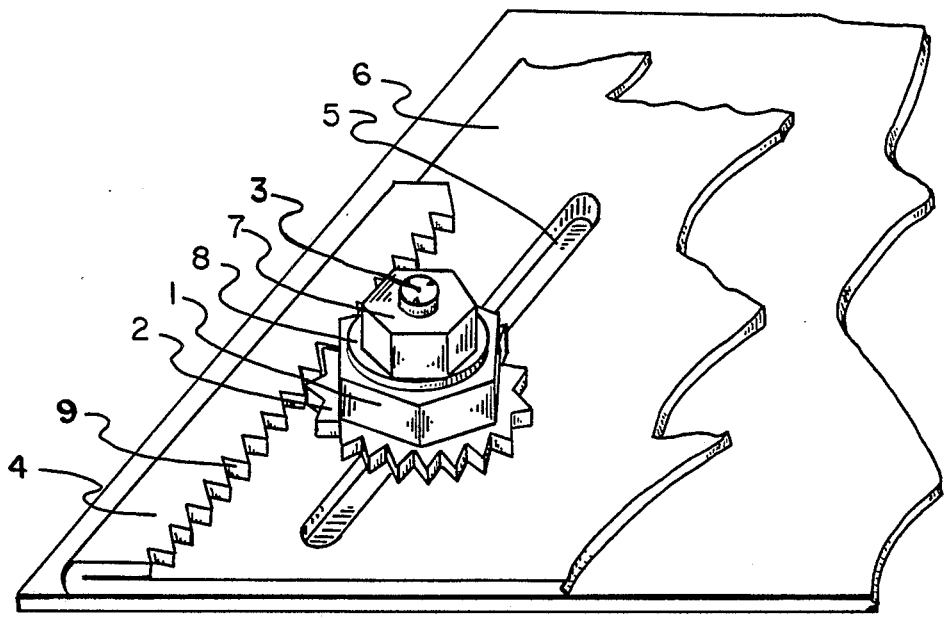
FIG.-1-
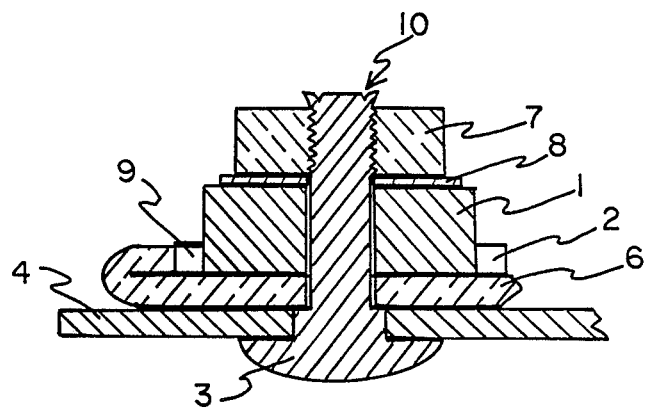
FIG.-2-

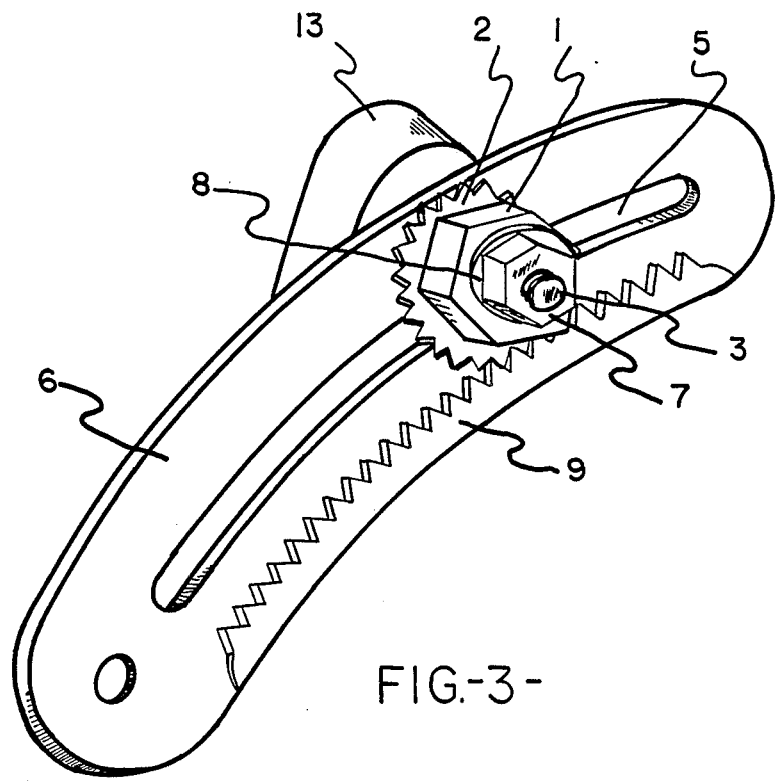
FIG.-3-
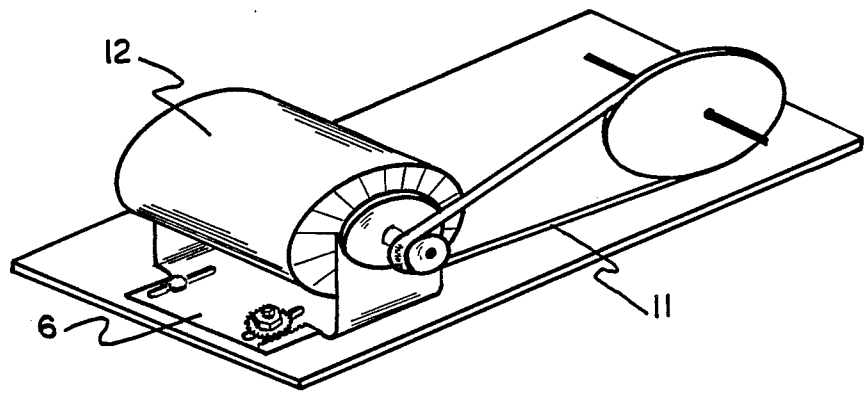
FIG.-4-

BELT ADJUSTER

FIELD OF THE INVENTION

This invention relates to the field of belt tensioning devices, and in particular to the field of devices intended to tighten drive belts for small rotary devices, popularly known a "V" belts.

These "V" belts tend to be critical in regard to the tension applied to them: if they are too loose, they do not transmit full torque, slip, and can be thereby damaged. If they are too tight, excessive wear to the belt and, worse yet, rapid wear on the bearings of both the driving and driven device can occur. Since added to this is the fact that, especially in the earlier portion of their life, these belts are subject to being stretched, it can be seen that a simple method to adjust tension of these belts is highly desirable.

PRIOR ART

The presently most widely used methods for tightning "V" belts is to provide one or the other of the driven objects with a means of changing its position by a small amount. On motors this usually involves having a motor mounting base with slots for mounting, the slots allowing the motor to be loosened and a tensioning means such as a crowbar or jackscrew to be used to tension the belt by moving the motor, after which the motor is then retightened. An alternative method, often found in automotive alternators, air conditioners, etc. is to provide an arcuate slotted plate to support one side of the device, while the other side is pivoted; the device is attached to the slotted plate by a bolt, which can be loosened, the unit pivoted with the aid of a lever to tension the belt, and then locked in place.

The crudeness of the tensioning applied by the above means has led to other, rather elaborate tensioning means, such as built-in jackshafts, separate idler pulleys which can be adjusted and locked in place, special belt tensioning tools which press apart the pulleys, and pulleys which can change their diameter by the insertion of spacing elements.

OBJECTS OF THE INVENTION

It is the object of the present invention to provide a simple modification to the usual existing devices whereby a belt may be precisely and easily tightened by ordinary hand tools without jackscrews, levers, etc. It is a further purpose of this invention to provide such a tightening means without requiring substantial modification of present means of mounting motors and automotive components as discussed above. It is an additional purpose of this invention to provide a belt tightening device as described above, that is both inexpensive and simple to manufacture, and which can be incorporated into present production tooling at minimal expense and difficulty.

BRIEF DESCRIPTION OF THE DRAWINGSS

Refer now, to the drawings: FIG. 1 is an overall view of one form of the invention; FIG. 2 is a partial cross section of the form of the invention shown in FIG. 1; FIG. 3 shows how the invention may be embodied in an arcuate adjusting plate as often used on alternators and the like in automotive applications. FIG. 4 shows how this form of the invention is used in practice, applied to a small motor or generator.

DESCRIPTION OF THE PREFERRED EMBODIMENT

Attending to the drawings, FIGS. 1 through 4, the description of the inveniton is as follows:

A hexagonal nut, (1) or other shape adapted to be engaged by a tool, is formed integrally with a gear or gearlike flange, (2) This gear-nut can be made in many ways, as by machining, stamping or being formed via sintering processes. This gear-nut, which has no internal threads, has a hole through its center, which can be slid over the unthreaded portion of the shank of axle bolt (3). Bolt (3), which is anchored in subplate (4), and protrudes through a slot (5) in movable plate (6), has a short thread at the extreme end, which is engaged with an ordinary threaded nut,(7). Nut (7) is spaced away from the gear-nut by means of a washer, (8), which, although not necessary, allows an easier adjustment between the gear-nut and nut (7). The gear-nut, which can turn freely upon the shank of axle bolt (3) when nut (7) is loose, has its teeth engaged with a set of matching teeth (9) which form a portion of plate (6).

FIG. 2 shows more clearly the relationship between the nut (7), washer (8) and gear-nut (1,2). Here, the entire shoulder bolt, (3) can be seen: in this case the anchoring means whereby it is kept from rotating in plate (4) is seen to be a square section which classes the bolt as a carriage bolt. An added detail, shown here, is a staked crown (10) which may be optionally used to prevent nut (7) from being backed entirely off of bolt (3), thus preventing its loss during adjustment. It may be appreciated by those skilled in the art that nut (7), used as a locking device can be equally replaced by sundry other functionally equivalent devices such as toggles, stop pins, etc.

FIG. 3 shows a modified form of the invention applied to an adjusting arm, such as those commonly found on automotive alternators. In this case, the toothed portion, (9) is pressed from the plate, (6) rather than folded as in FIG. 1, folding not being practical in the arcuate plate. Subplate (4) is missing, of course, the axle bolt (3) being a stud anchored in the alternator or other accessory (13), as is common in the art.

In FIG. 4, an overall diagrammatic view of a small motor or generator (12) with a "V" belt (11) is seen. The application of the present invention to the motor base, (6) is clearly shown.

OPERATION

In operation, the first form of the invention, as illustrated in FIG. 1, is mounted on the frame of the motor mount as shown in FIG. 4. The nut (7) is loosened, then the gear-nut is rotated, causing the frame to move to tighten or loosen the belt. This action tightens the "V" belt (11) in a controlled manner, permitting an exact adjustment. When the proper tension has been achieved, the locking nut, (7) is tightened, binding the gear-nut between the washer (8) and the movable plate (6), thereby effectively locking the movable plate (6), and motor (12), into place, which retains the belt tension.

In a like manner, the embodiment of the invention shown in FIG. 3 can be operated by loosening the single nut, (7), turning the gear-nut (1,2) to move the accessory (13), and then retightening the locking nut (7) to lock the assembly in place.

It may be seen the the present invention is very simple to operate, is convenient to use, and allows accurate adjustement of belt tension. It is equally obvious that the applications and adaptations of this invention are many and varied, and therefore cannot be limited to the particular adaptations which have been described here.

I claim:

1. A belt tensioning device comprising a fixed axle, said fixed axle extending through a slotted opening in a plate, said fixed axle having disposed upon it a first rotatable member positioned on said fixed axle, such that it is located on the opposite side of said plate from the point of fixation of said fixed axle, said first rotatable member configured to be engaged with a tool, said first rotatable member having teeth thereon, said teeth engagable with corresponding mating teeth on said plate in such manner that rotation of said first rotatable member produces relative movement between said fixed axle and said plate, said axle bearing thereon a second rotatable member positioned on said axle such that said first rotatable member is between it and said plate, said second rotatable member comprising a lock whereby the rotation of said first rotatable member is either allowed or prevented.

2. A belt tensioning device as in claim 1, in which said axle has a threaded portion, said threaded portion engagable with threads on said second rotatable member, rotating action thereof comprising said lock.

3. A belt tensioning device as in claim 1 in which said plate comprises an arcuate adjusting arm.

* * * * *